(12) United States Patent
Vashi et al.

(10) Patent No.: US 8,705,448 B2
(45) Date of Patent: Apr. 22, 2014

(54) VOICE AND DATA CONNECTION CONTROL IN A MOBILE DEVICE

(75) Inventors: Prashant H. Vashi, Sunnyvale, CA (US); Gaurav R. Nukala, Sunnyvale, CA (US); Sharad Garg, San Jose, CA (US)

(73) Assignee: Apple Inc., Cupertino, CA (US)

( * ) Notice: Subject to any disclaimer, the term of this patent is extended or adjusted under 35 U.S.C. 154(b) by 475 days.

(21) Appl. No.: 12/987,020

(22) Filed: Jan. 7, 2011

(65) Prior Publication Data

US 2012/0176963 A1    Jul. 12, 2012

(51) Int. Cl.
*H04W 4/00*    (2009.01)
*H04W 76/02*    (2009.01)

(52) U.S. Cl.
CPC ................................. *H04W 76/027* (2013.01)
USPC .......................................... 370/328; 370/329

(58) Field of Classification Search
USPC .................................................. 370/328, 329
See application file for complete search history.

(56) References Cited

U.S. PATENT DOCUMENTS

| | | | |
|---|---|---|---|
| 5,590,406 A | 12/1996 | Bayley et al. | |
| 7,693,509 B2 | 4/2010 | Miyata | |
| 7,809,387 B2 | 10/2010 | Chaudry et al. | |
| 2003/0119520 A1 | 6/2003 | Yoshioka et al. | |
| 2004/0022209 A1* | 2/2004 | Misra et al. | 370/328 |
| 2009/0052501 A1* | 2/2009 | Sato | 375/145 |

FOREIGN PATENT DOCUMENTS

| | | |
|---|---|---|
| WO | WO2005064891 | 7/2005 |
| WO | WO2010105222 | 9/2010 |

OTHER PUBLICATIONS

PCT Application No. PCT/US2012/020367—International Search Report and Written Opinion dated Aug. 2, 2013.

* cited by examiner

*Primary Examiner* — Afshawn Towfighi
(74) *Attorney, Agent, or Firm* — Womble Carlyle Sandridge & Rice LLP

(57) ABSTRACT

Controlling non-simultaneous voice and data connections between a mobile wireless device and a wireless network is described. Following a voice connection origination failure between the mobile wireless device and the wireless network, the mobile wireless device sends a voice connection redial request only after closing an existing data connection between the mobile wireless device and the wireless network. The mobile wireless device tunes a wireless transceiver to a second voice connection channel radio frequency that differs from a first data connection channel radio frequency and establishes a voice connection with the wireless network on the second voice connection channel radio frequency.

20 Claims, 8 Drawing Sheets

VOICE AND DATA CONNECTION CONTROL IN A MOBILE DEVICE

TECHNICAL FIELD

The described embodiments relate generally to wireless mobile communications. More particularly, a method is described for controlling voice and data connections used for communication between a mobile wireless communication device and a wireless communication network.

BACKGROUND OF THE INVENTION

Mobile wireless communication devices, such as a cellular telephone or a wireless personal digital assistant, can provide a wide variety of communication services including, for example, voice communication, text messaging, internet browsing, and electronic mail. Mobile wireless communication devices can operate in a wireless communication network of overlapping "cells", each cell providing a geographic area of wireless signal coverage that extends from a radio network subsystem located in the cell. The radio network subsystem can include a base transceiver station (BTS) in a Global System for Communications (GSM) network or Code Division Multiple Access (CDMA) network or a Node B in a Universal Mobile Telecommunications System (UMTS) network. The radio network subsystem can also be referred to as a radio access network (RAN) in a CDMA network.

The mobile wireless communication device can receive signals transmitted from one or more cells in the wireless communication network. The radio network subsystems in each of the cells can be located at different distances from the mobile wireless communication device, and therefore signals received at the mobile wireless communication device can vary in signal strength and/or signal quality. The mobile wireless communication device can measure and monitor the received signals to determine to which cells a connection can be achieved and maintained. Together with one or more radio network subsystems in the wireless communication network, the mobile wireless communication device can select to which cells to connect and disconnect as the mobile wireless communication device moves throughout the wireless network.

Multi-functional mobile wireless communication devices can offer the user a combination of voice and data connections. Some wireless communication network technologies, such as the third generation (3G) UMTS, can provide voice and data connections simultaneously, while other wireless communication network technologies such as the second generation (2G) CDMA 2000, can provide voice and data connections individually but not simultaneously. The mobile wireless communication device can connect to a wireless communication network that can offer "non-simultaneous" voice and data connections by switching between voice and data connections rapidly, thereby permitting the user both services with minimal interruption. In some implementations, a voice connection can take precedence over a data connection, and the mobile wireless communication device can suspend or disconnect a data connection during a voice connection and later re-establish the data connection. Originating a voice connection can include multiple call origination retries when a first call origination fails. The call iterations can repeat at widely spaced time intervals, and a data connection can be re-established in between voice call originations. If the data connection is not properly terminated before any of the voice call originations, then the data connection can terminate improperly resulting in a dropped data connection, which can be logged as a device fault by the network for the mobile wireless communication device and waste network resources.

Thus there exists a need to control voice and data connections more effectively between a mobile wireless communication device and a wireless communication network.

SUMMARY OF THE DESCRIBED EMBODIMENTS

The described embodiments relate generally to wireless mobile communications. More particularly, a method is described for controlling voice and data connections used for communication between a mobile wireless communication device and a wireless communication network.

In one embodiment, a method to control voice and data connections is performed at a mobile wireless device when the mobile wireless device is connected to a wireless network. The method includes at least the following steps. The mobile wireless device receives a voice connection redial request. The mobile wireless device closes an existing data connection between the mobile wireless device and the wireless network in response to the voice connection redial request. The mobile wireless device tunes a transceiver within to a second voice connection channel radio frequency. The second voice connection channel radio frequency differs from a first data connection channel radio frequency used for the existing (and now closed) data connection. The mobile wireless device originates a voice connection to the wireless network and establishes a voice connection with the wireless network on the second voice connection channel radio frequency. In a representative embodiment, the voice connection redial request follows a voice connection origination failure between the mobile wireless device and the wireless network.

In a further embodiment, a mobile wireless device including a wireless transceiver to transmit and receive signals from a radio network subsystem in a wireless network and an application processor coupled to the wireless transceiver is described. The application processor is arranged to execute the following instructions. The application processor manages switching the wireless transceiver between voice connections and data connections to the wireless network. The application processor sends a voice connection redial request to the wireless transceiver following a voice connection origination failure between the mobile wireless device and the wireless network. The transceiver receives the voice connection redial request form the application processor. The wireless transceiver closes an existing data connection between the mobile wireless device and the wireless network. The wireless transceiver tunes to a second voice connection channel radio frequency different from a first data connection channel radio frequency. The wireless transceiver establishes a voice connection with the wireless network on the second voice connection channel radio frequency.

In another embodiment, a non-transitory computer program product encoded in a non-transitory computer readable medium for managing voice connections and data connections between a mobile wireless device and a radio network subsystem in a wireless network is described The non-transitory computer program product includes non-transitory computer program code for receiving a voice connection redial request. The non-transitory computer program product also includes non-transitory computer program code for closing an existing data connection between the mobile wireless device and a wireless network. The non-transitory computer program product also includes non-transitory computer program code for tuning a transceiver in the mobile wireless device to a second voice connection channel radio frequency different from the first data connection channel radio frequency. The non-transitory computer program product further includes non-transitory computer program code for originating a voice connection to the wireless network. The non-transitory computer program product additionally includes non-transitory computer program code establishing a voice connection with the wireless network through the radio network subsystem on the second voice connection channel radio frequency.

BRIEF DESCRIPTION OF THE DRAWINGS

The invention and the advantages thereof may best be understood by reference to the following description taken in conjunction with the accompanying drawings.

DETAILED DESCRIPTION OF EXAMPLE EMBODIMENTS

In the following description, numerous specific details are set forth to provide a thorough understanding of the concepts underlying the described embodiments. It will be apparent, however, to one skilled in the art that the described embodiments may be practiced without some or all of these specific details. In other instances, well known process steps have not been described in detail in order to avoid unnecessarily obscuring the underlying concepts.

Figure 1:
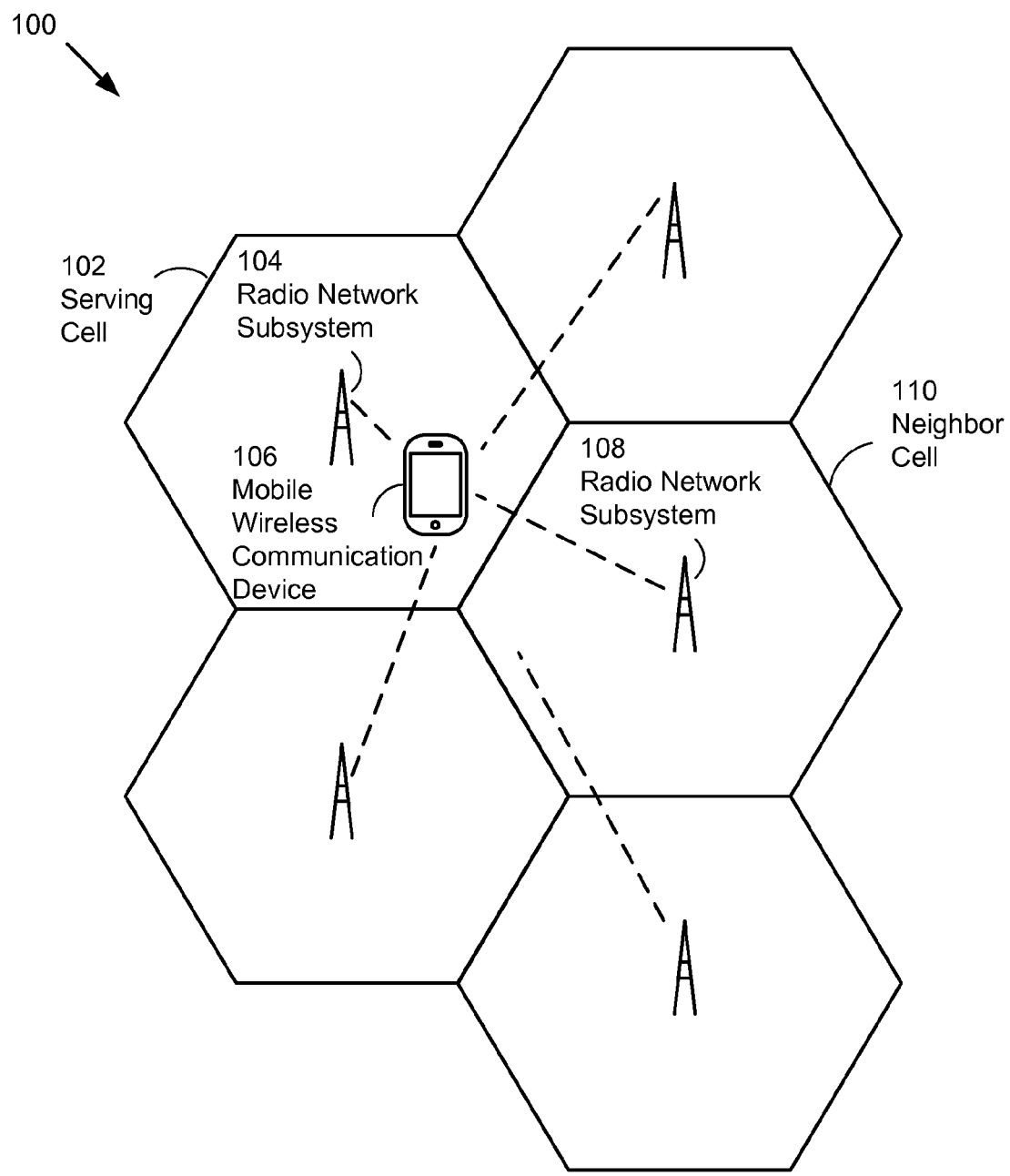
FIG. 1 illustrates a mobile wireless communication device located within a wireless cellular communication network.

FIG. 1 illustrates a wireless communication network 100 of overlapping wireless communication cells to which a mobile wireless communication device 106 can connect. Each wireless communication cell can cover a geographic area extending from a centralized radio network subsystem. The mobile wireless communication device 106 can receive communication signals from a number of different cells in the wireless communication network 100, and each cell can be located at a different distance from the mobile wireless communication device. In a second generation (2G) wireless communication network, e.g. a network following a Global System for Mobile Communications (GSM) protocol, the mobile wireless communication device 106 can connect to a radio network subsystem in the wireless communication network 100 using one radio link at a time serially. For example, the mobile wireless communication device 106 can be connected initially to a radio network subsystem (RNS) 104 in a serving cell 102. The mobile wireless communication device 106 can monitor signals from radio network subsystems in neighbor cells. The mobile wireless communication device 106 can transfer its connection from the radio network subsystem 104 in the serving cell 102 to a radio network system 108 in a neighbor cell 110 as the mobile wireless communication device moves within the wireless communication network 100. The mobile wireless communication device 106 can monitor signals from nearby cells and can keep track of signal quality received at the mobile wireless communication device 106 from each of the cells. Information about received signal quality can be communicated by the mobile wireless communication device to the wireless communication network 100 using measurement messages (or more generally management messages or control messages). The wireless communication network 100 can use the information provided in the measurement messages to determine if and when to change the cell to which the mobile wireless communication device 106 can be connected.

In a third generation (3G) wireless communication network, such as a network based on a Universal Mobile Telecommunication System (UMTS) protocol, the mobile wireless communication device 106 can be connected to one or more radio network subsystems simultaneously through multiple radio access bearers. Each of the radio access bearers can transport a different communication service independently, such as a voice service on a first radio access bearer and a data service on a second radio access bearer. The mobile wireless communication device 106 can also be connected by multiple radio access bearers simultaneously to the radio network subsystem (RNS 104) in the serving cell 102 (if the RNS 104 supports such a simultaneous multiple radio link connection). The mobile wireless communication device 106 can also be connected by a first radio access bearer to the RNS 104 in the serving cell 102 and to a second RNS 108 in the neighbor cell 110 simultaneously. Advanced mobile wireless communication devices, sometimes referred to as "smart" phones, can provide a diverse array of services to the user using a connection with multiple radio access bearers. A user of the advanced mobile wireless communication device 106 can use both a voice connection and a simultaneous data connection. Some communication protocols, however, such as the CDMA 2000 1X and Evolution Data Optimized (EVDO) protocols can offer voice and data connections individually and serially but not simultaneously. Methods to manage voice and data connections in devices using protocols that do not permit simultaneous voice and data connections can ensure minimal interruption and minimize dropped connections as will be described herein.

In a code division multiple access (CDMA) network, the mobile wireless communication device 106 can also be connected through multiple radio links to the wireless communication network 100, particularly during a procedure known as soft handoff (or soft handover). Continuous access to communication services while the mobile wireless communication device 106 traverses the wireless communication network can require a seamless handoff between different radio network subsystems located in different cells. The mobile wireless communication device 106 can be connected to two or more cells simultaneously, and radio frequency signals from each of the cells to which the mobile wireless communication device 106 is connected can be used together to improve call performance. In a CDMA2000 or EVDO network, the multiple radio links, however, can be used for one particular connection at a time, such as for a voice connection or for a data connection, but not for two different data connections simultaneously. When originating a voice connection, an existing data connection can be properly terminated and layer re-established when the voice connection terminates.

Figure 2:
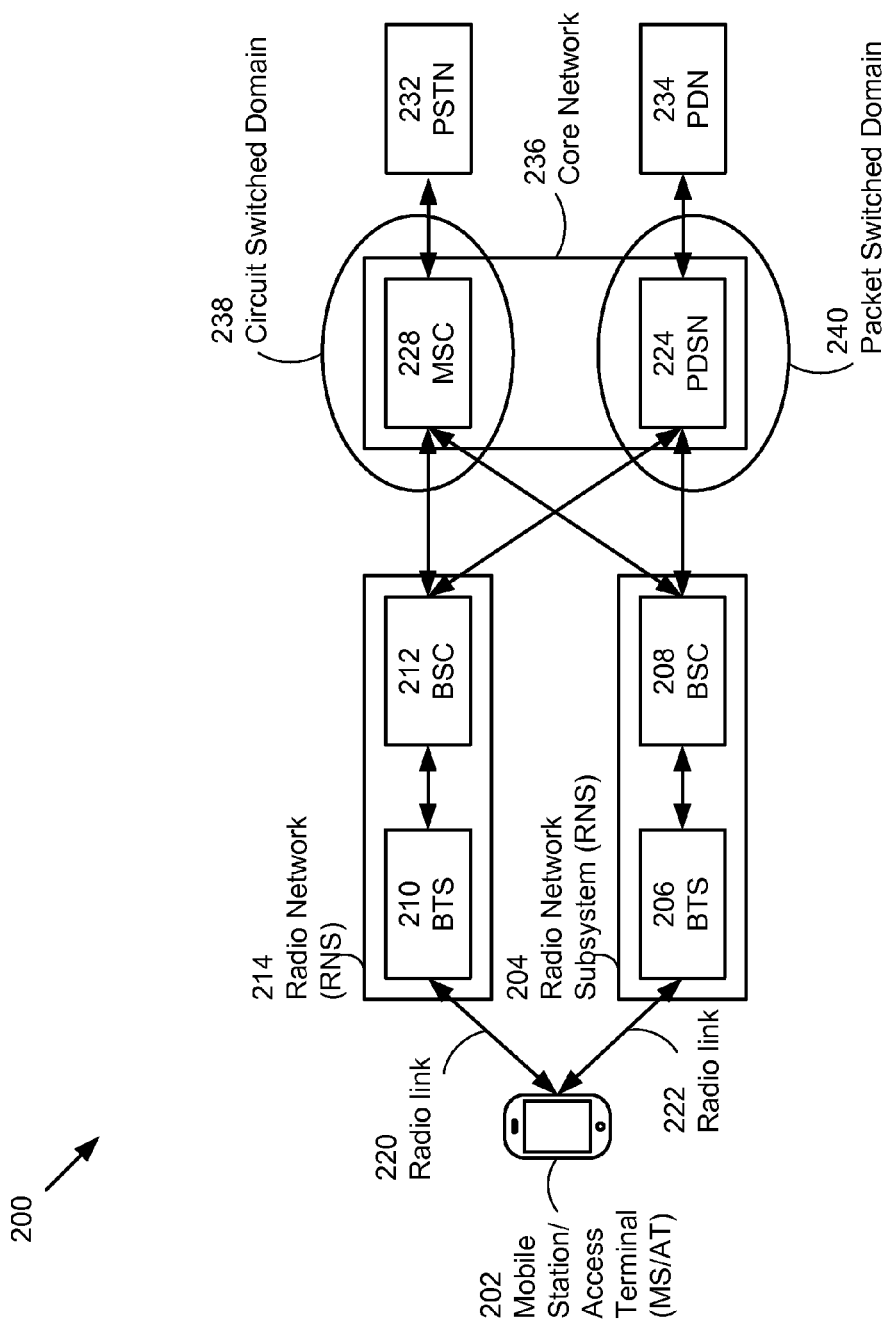
FIG. 2 illustrates a hierarchical architecture for a wireless communication network.

FIG. 2 illustrates a hierarchical network architecture 200 for a CDMA network. A mobile wireless communication device 106 in a CDMA network can be referred to as a mobile station (MS) for voice services and as an access terminal (AT) for data services. Herein, the terms mobile device, mobile wireless device, mobile wireless communication device 106 and mobile station/access terminal (MS/AT) 202 can be used interchangeably as referring the same capability, namely for a mobile device capable of voice connections and data connections to a CDMA wireless network. The MS/AT 202 can connect to one or more radio network subsystems (RNS) 204/214 through one or more radio links 220/222 using a CDMA communication protocol. (The RNS 204/214 can also be referred to as a radio access network.) The radio links 220/222 connect the MS/AT 202 to the wireless network 100 through baseband transceiver stations (BTS) 206/210 located in the respective RNS 204/214. The BTS 206/210 can be controlled by base station controllers (BSC) 208/212. The RNS 204/214 can be connected to a mobile switching center (MSC) 228 located in a circuit switched domain 238 that can handle circuit switched traffic, such as voice calls, to interconnect the MS/AT 202 to the public switched telephone network (PSTN) 232. The RNS 204/214 can also be connected to a packet data serving node (PDSN) 224 located in a packet switched domain 240 that can handle packet switched traffic, such as data connections, to interconnect the MS/AT 202 to a public data network (PDN) 234.

The MS/AT 202 can be connected simultaneously to more than one RAN 204/214 to provide improved performance and seamless handoff between cells. The MS/AT 202 can monitor radio frequency signals received from the BTS 206/210 to which the MS/AT 202 can be connected as well as from additional BTS located in other cells to which the MS/AT 202 can also connect. Based on measurements of radio frequency signals received from the BTS, the MS/AT 202 can transmit messages that contain measurement information to the wireless communication network 100 and can receive control messages from the wireless communication network 100 that can add or delete connections to one or more of the BTS monitored. In a CDMA 2000 1X and EVDO network, the MS/AT 202 can establish and maintain a voice connection or a data connection, and each connection can use multiple radio links 220/220; however the voice connection and data connections cannot co-exist simultaneously. Instead, the MS/AT 202 can suspend the existing first connection, establish a second connection and later re-establish the first connection. Establishing a connection can use a sequence of commands exchanged between the MS/AT 202 and the BSC 208/212 in the RNS 204/214 of the wireless network 100.

Figure 3:
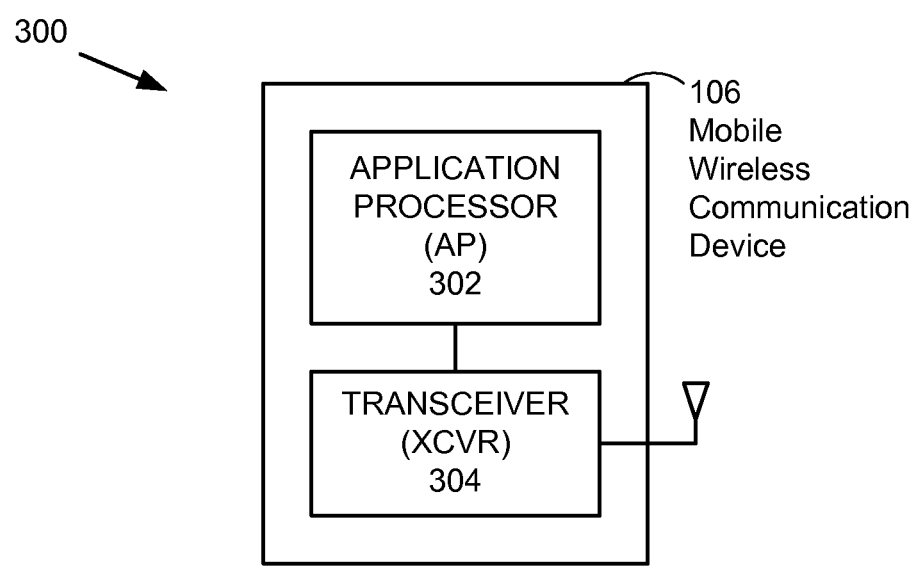
FIG. 3 illustrates a mobile wireless communication device.

FIG. 3 illustrates processing elements 300 of a mobile wireless communication device 106 including an application processor (AP) 302 and a transceiver (XCVR) 304. The AP 302 can perform higher layer functions, such as requesting the establishment, suspension and termination of connections. The AP 302 can form messages that can be transmitted by the XCVR 304 to the wireless network 100. The AP 302 can also receive messages from the wireless network 100 through the XCVR 304. The XCVR 304 can transform messages received from the AP 302 into a form appropriate for transmission using radio waves to communicate with the RNS 204/214 in the wireless network 100. In some embodiments, the division between the AP 302 and the XCVR 304 can also be achieved by different processing blocks operating within a more general purpose common computing unit.

Figure 4:
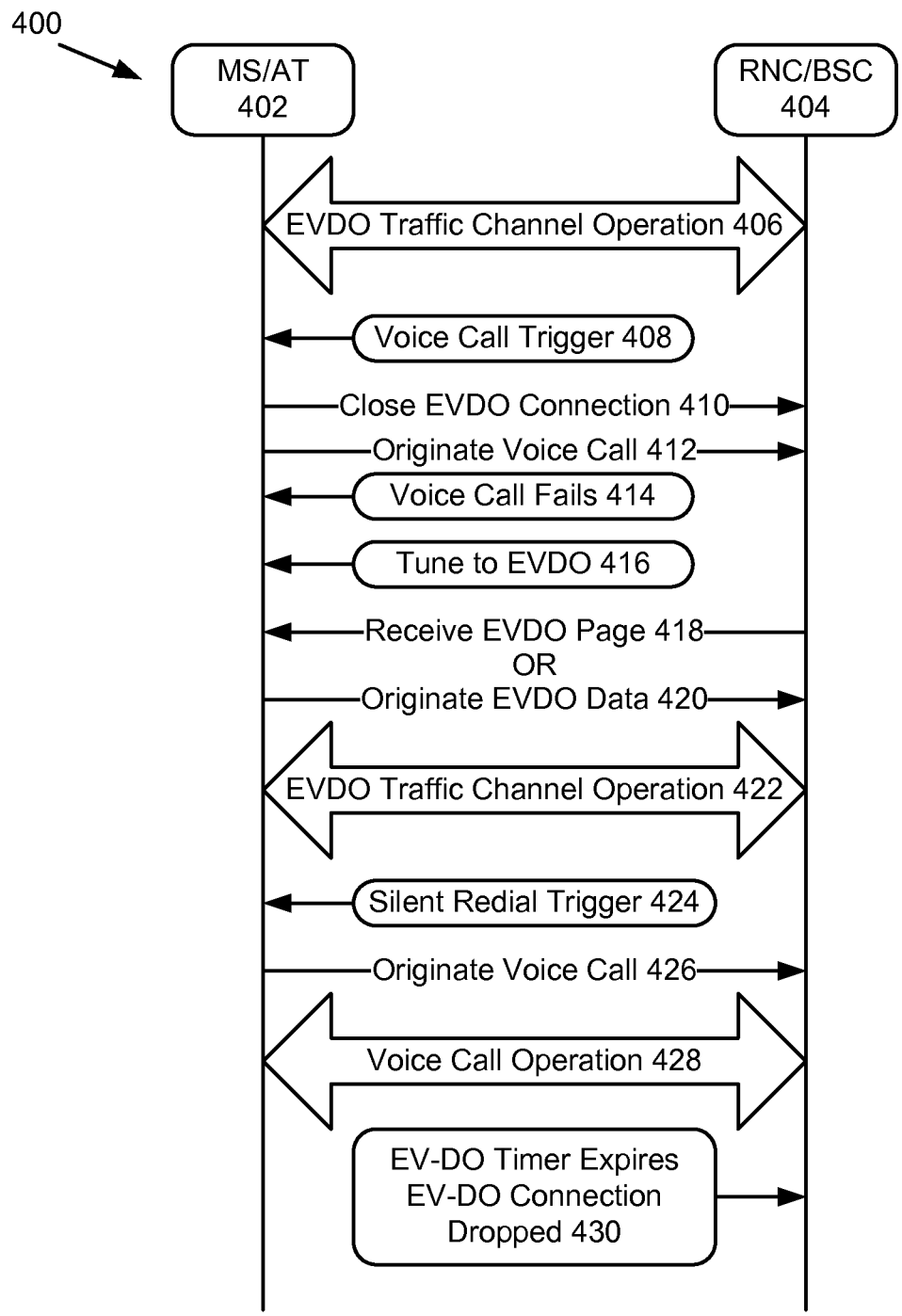
FIG. 4 illustrates a voice and data connection interaction with a dropped data connection.

FIG. 4 illustrates an event sequence 400 in which a data connection can be dropped after establishing a voice connection between an MS/AT 402 and a radio network controller (RNC)/base station controller (BSC) 404 in the wireless network 100. Initially, the MS/AT 402 and the RNC/BSC 404 can have established a data connection using an EVDO traffic channel 406. The MS/AT 402 can receive a voice call trigger 408. The voice call trigger can originate from a user of the MS/AT 402 in order to establish a voice connection. The MS/AT 402 can close the data connection 410 by sending one or more messages to the RNC/BSC 404 in the wireless network 100. The EVDO data connection can be closed 410 without being perceived as dropped by the RNC/BSC 404. The MS/AT 402 can subsequently originate a voice connection 412 by sending one or more messages with the RNC/BSC 404. (The terms call and connection can be used interchangeably herein.) The voice connection can use a separate radio frequency from the data connection. To complete and establish the voice connection, an exchange of messages between the MS/AT 402 and RNC/BSC 404 can occur. Under certain network conditions, such as when insufficient radio resources are available to assign to the MS/AT 402 by the RNC/BSC 404 to use in the radio frequency access portion of the wireless network, the voice connection can fail to be established 414. The MS/AT 402 can subsequently tune the XCVR 304 to the radio frequency previously used for the data connection 416, even though the voice connection failed and the MS/AT 402 can be reattempting to establish the voice connection. The time interval between successive attempts to form the voice connection can be sufficiently long that it can be preferred to provide an opportunity for a data connection between successive attempts to the user of the MS/AT 402. In this manner, the user can experience a data connection while the voice connection can be pending.

The MS/AT 402 can then receive a page to establish an EVDO data connection 418 from the RNC/BSC 404. Alternatively, the MS/AT 402 can seek to originate an EVDO data connection 420. As the radio resources available for voice connections and data connections can differ, the MS/AT 402 can establish a data connection 422 even though a voice connection can be pending. The MS/AT 402 can then receive a "silent redial" trigger 424 to establish the pending voice connection. As with the original voice connection origination 412, the MS/AT 402 can seek to originate a voice connection 426 by sending one or more messages to the RNC/BSC 404. When sending the voice connection origination 426 messages, the XCVR 304 can be tuned a different radio frequency than used for the data connection. As such, the data connection can be suspended during the voice call origination 426. The data connection, however, can be not formally closed as performed earlier 410 for the initial voice call origination 412. When the second voice connection origination 426 that follows the silent redial trigger 424 completes successfully, a voice connection can be established with full voice connection operation 428 ensuing. During the voice connection operation 428, no traffic can occur on the EVDO data connection, and eventually an EVDO data connection timer can expire at the RNC/BSC 404. The RNC/BSC 404 can drop the unused EVDO data connection 430 with the MS/T 402 in order to reassign unused radio resources to another mobile device.

The event sequence 400 shown in FIG. 4 can result in a "dropped call" being logged for the MS/AT 402 by the RNC/BSC 404 in the wireless network 100 following the EVDO data connection drop 430. The data connection drop 430 indirectly resulted from the voice connection establishment following the silent redial trigger 424 when the existing data connection was not closed. Radio resources for the data connection can be suspended for the period of time when the MS/AT 402 tunes the XCVR 304 to originate, establish and operate the voice connection 426/428. During this period of time and before the EVDO timer expiration, the radio resources can be assigned to the MS/AT 402 by the RNC/BSC 404 but remain unused. As radio resources can be scarce, it can be preferred to avoid such underutilization. Additionally the MS/AT 402 can be marked as incurring a dropped EVDO data connection even though the signals for the radio frequency data connection can be adequate to maintain the data connection. Instead, it can be preferable to close data connections whenever originating a voice connection, whether the voice connection originates originally or subsequent to a voice connection failure followed by a redial attempt.

Figure 5:
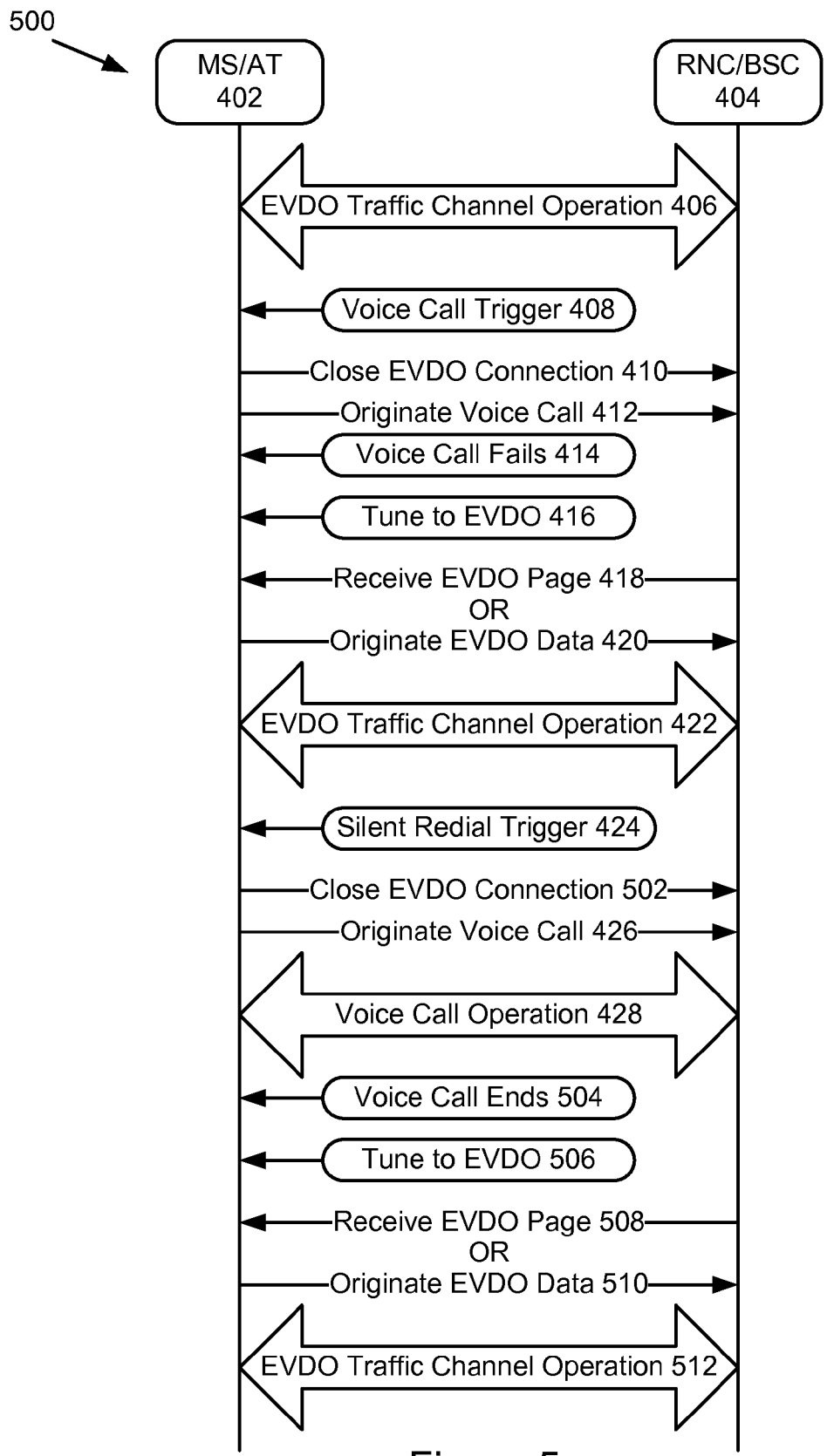
FIG. 5 illustrates a voice and data connection interaction without a dropped data connection

FIG. 5 illustrates an event sequence 500 between the MS/AT 402 and the RNC/BSC 404 that closes an existing data connection before originating a voice connection. As with the event sequence 400 illustrated in FIG. 4, the MS/AT 402 and RNC/BSC 404 have an existing EVDO data connection in operation 406. This data connection can be closed 410 during the first voice connection origination attempt 412 which subsequently fails 414. The EVDO data connection can be re-established and operational 422 when the silent redial trigger occurs 424. In response to the silent redial retrigger 424, the MS/AT 402 can close the existing EVDO data connection 502 by sending one or more messages to the RNC/BSC 404. After closing the EVDO data connection, the MS/AT 402 can originate, establish and operate a voice connection 426/428 without a dropped EVDO data connection resulting. After the voice connection terminates 504, the MS/AT 402 can tune the XCVR 304 back to the EVDO data connection radio frequency 506. When the MS/AT 402 receives an EVDO data page 508 from the RNC/BSC 404 in the wireless network 100 or sends an EVDO data origination request 510 to the RNC/BSC 404, an EVDO data connection can be re-established and EVDO data traffic can be exchanged 512. By closing the EVDO data connection after any voice call origination including a silent redial trigger 424, EVDO data radio frequency resources can be reallocated by the RNC/BSC 404 resulting in more efficient use of scare radio frequency resources in the radio access network. The MS/AT 402 can also be not incorrectly marked as incurring a dropped EVDO data connection, as the EVDO data connection can be properly closed before establishing the voice connection. Statistics for dropped connections gathered by the RNC/BSC 404 in the wireless network 100 can thus more accurately reflect the true radio frequency conditions experienced by the MS/AT 402.

Figure 6:
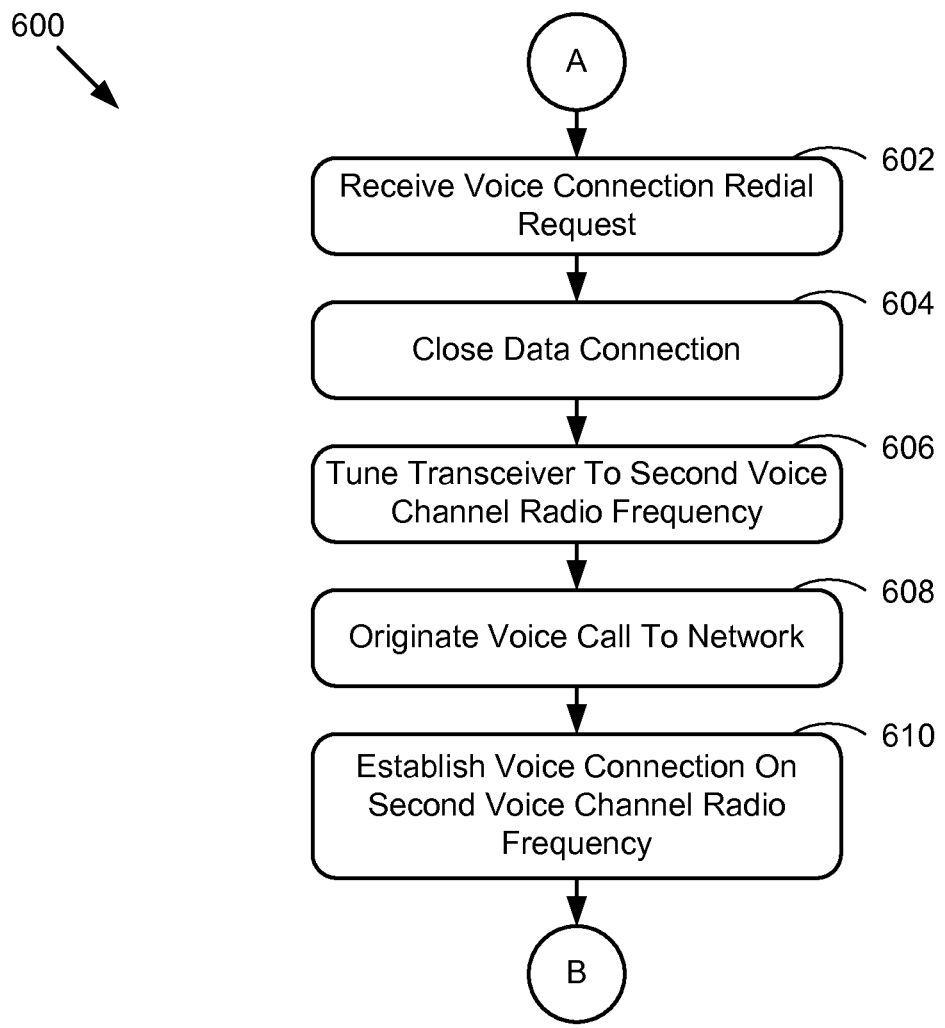
FIGS. 6, 7 and 8 illustrate three stages of steps in a method to manage voice and data connections without dropping the data connection.

FIG. 6 illustrates a first sequence of steps 600 in a method to manage voice and data connections in the mobile wireless communication device 106. This sequence 600 can occur together with or separately from sequences shown in FIGS. 7 and 8 that follow. The mobile wireless communication device 106 can receive a voice connection redial request in step 602. This voice connection redial request 602 can occur after a previous voice connection origination has failed (not shown). In step 604, the mobile wireless communication device 106 can close an existing data connection with the wireless network 100. Closing the data connection 604 can include exchanging a series of messages between the mobile wireless communication device 106 and one or more radio network subsystems 204/214 in the wireless network 100. The transceiver 304 in the mobile wireless communication device 106 can be tuned to a second voice channel radio frequency in step 606. This second voice channel radio frequency can differ from a first data channel radio frequency used by the transceiver 304 for the data connection before its closure. In step 608, the mobile wireless communication device 106 can originate a voice call to the wireless network by sending one or more messages to the radio network subsystems 204/214. In step 610, a voice connection can be established between the mobile wireless communication device 106 and one or more of the radio network subsystems 204/214 in the wireless network 100 using the second voice channel radio frequency. Using the steps shown in FIG. 600, the data connection be closed when establishing the voice connection, including when the voice connection follows a redial request.

Figure 7:
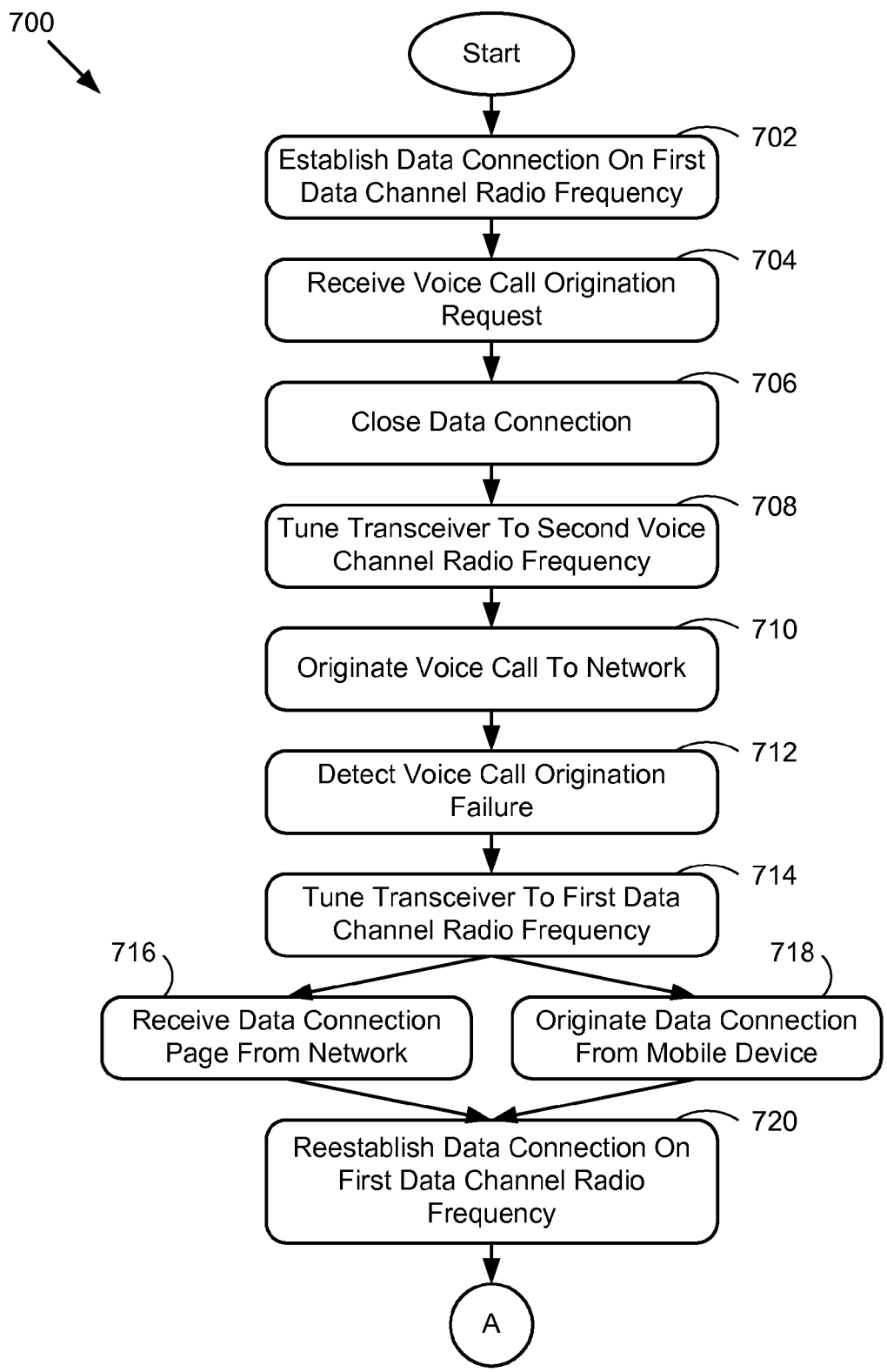

FIG. 7 illustrates an event sequence 700 of additional steps that can occur before the steps shown in FIG. 6. In step 702, the data connection between the mobile wireless communication device 106 and the radio network subsystems 204/214 in the wireless network 100 can be established on a first data channel radio frequency. In step 704, the mobile wireless communication device 106 can receive a voice call origination request 704. The voice call origination request can be a result of a voice connection request form a user of the mobile wireless communication device 106. In step 706, the mobile wireless communication device 106 can close the existing data connection with the wireless network 100 by sending one or more messages to the radio network subsystems 204/214. Subsequently, in step 708, the mobile wireless communication device 106 can tune the transceiver 304 to the second voice channel radio frequency 708. The second voice channel radio frequency 708 can differ from the first data channel radio frequency used previously for the now closed data connection. The mobile wireless communication device in step 710 can originate a voice connection by sending one or more messages to the radio network subsystems 204/214 in the wireless network 100.

Due to a number of network conditions, such as inadequate radio frequency resources to assign to the mobile wireless communication device by the wireless network 100 in response to the voice call origination request, the voice connection origination can fail. In step 712, the mobile wireless communication device 106 can detect the voice connection origination failure. Rather than immediately repeat the voice connection origination request, the mobile wireless communication device can wait a pre-determined amount of time. During this time interval between voice connection origination requests, the mobile wireless communication device 106 can tune the transceiver 304 to the first data channel radio frequency 714 used previously for the now closed data connection. A data connection can be re-established in step 720 using the first data channel radio frequency in response to either receipt of a data connection page from the wireless network (step 716) or based on a data connection origination from within the mobile wireless communication device 106 (step 718). With a data connection re-established, the mobile wireless communication device 106 can subsequently attempt to establish a voice connection by closing the data connection first as illustrated in FIG. 6.

Figure 8:
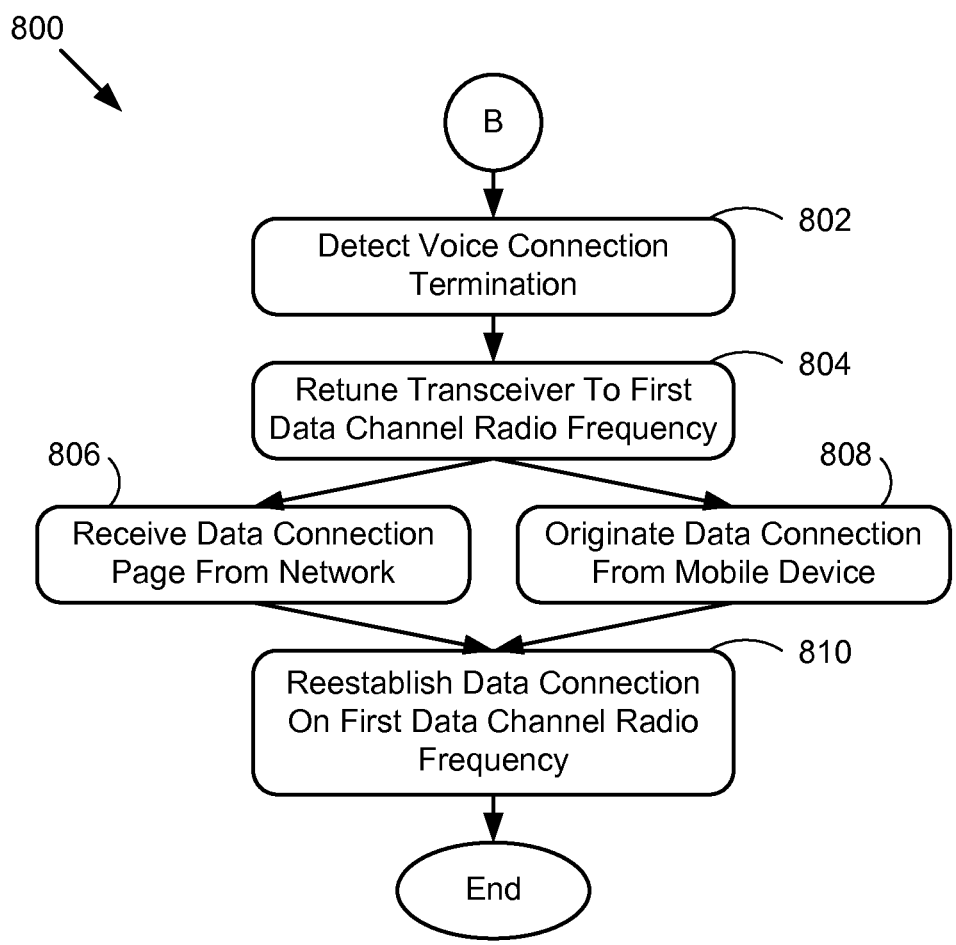

FIG. 8 illustrates a sequence of events 800 that can occur subsequent to the establishment of a voice connection shown in FIG. 6. In step 802, the mobile wireless communication device 106 can detect the voice connection to the wireless network 100 terminates. In step 804, the mobile wireless communication device 106 can tune the transceiver 304 to the first data channel radio frequency used previously. The mobile wireless communication device 106 can listen for an "external" data connection request from the wireless network or an "internal" data connection request from within the mobile wireless communication device 106. The mobile wireless communication device 106 can reestablish a data connection on the first data channel radio frequency in step 810 in response to receiving a data connection page from the wireless network 100 (step 806) or by originating a data connection request itself (step 808). The steps illustrated in FIGS. 6, 7 and 8 illustrate the mobile wireless communication device 106 originating, establishing, operating and terminating data connections and voice connections with a dropped connection occurring between the mobile wireless communication device 106 and the wireless network 100.

The previous description was specifically outlined for a mobile wireless communication device 106 using CDMA 2000 1X and CDMA 2000 EVDO communication protocols as a representative embodiment. Other wireless protocols that can permit sequential voice and data connections with "silent redial" for the voice call origination can also benefit from the methods described herein.

Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line used to fabricate thermoplastic molded parts. The computer readable medium is any data storage device that can store data which can thereafter be read by a computer system. Examples of the computer readable medium include read-only memory, random-access memory, CD-ROMs, DVDs, magnetic tape, optical data storage devices, and carrier waves. The computer readable medium can also be distributed over network-coupled computer systems so that the computer readable code is stored and executed in a distributed fashion.

The various aspects, embodiments, implementations or features of the described embodiments can be used separately or in any combination. The foregoing description, for purposes of explanation, used specific nomenclature to provide a thorough understanding of the invention. However, it will be apparent to one skilled in the art that the specific details are not required in order to practice the invention. Thus, the foregoing descriptions of specific embodiments of the present invention are presented for purposes of illustration and description. They are not intended to be exhaustive or to limit the invention to the precise forms disclosed. It will be apparent to one of ordinary skill in the art that many modifications and variations are possible in view of the above teachings.

The embodiments were chosen and described in order to best explain the principles of the invention and its practical applications, to thereby enable others skilled in the art to best utilize the invention and various embodiments with various modifications as are suited to the particular use contemplated.

We claim:

1. A method, comprising:
at a mobile wireless device:
receiving a voice connection request;
initiating a first voice connection with a remote device in response to receiving the voice connection request;
detecting a failure of the first voice connection;
establishing a data connection with a wireless network;
receiving a voice connection redial request, wherein the voice connection redial request is received after detecting the failure of the first voice connection;
closing the data connection with the wireless network;
tuning a transceiver of the mobile wireless device to a voice connection channel radio frequency that is different from a data connection channel radio frequency associated with the data connection; and
initiating a second voice connection, associated with the voice connection redial request, with the remote device, wherein the second voice connection uses the voice connection channel radio frequency.

2. The method as recited in claim 1, wherein the voice connection redial request originates from an application processor in the mobile wireless device.

3. The method as recited in claim 1, further comprising:
before initiating the first voice connection with the remote device:
establishing an initial data connection with the wireless network;
in response to receiving the voice connection request, closing the initial data connection with the wireless network; and
tuning the transceiver of the mobile wireless device to the voice connection channel radio frequency in preparation for initiating the first voice connection with the remote device.

4. The method as recited in claim 1, further comprising:
receiving a data connection page from the wireless network; and
in response to receiving the data connection page, establishing the data connection with the wireless network.

5. The method as recited in claim 1, further comprising:
receiving a data connection origination request from an application processor in the mobile wireless device; and
in response to receiving the data connection origination request, establishing the data connection with the wireless network.

6. The method as recited in claim 1, further comprising:
detecting a termination of the second voice connection associated with the voice connection redial request;
tuning the transceiver of the mobile wireless device to the data connection channel radio frequency; and
reestablishing the data connection with the wireless network.

7. The method as recited in claim 6, further comprising:
receiving a data connection page from the wireless network; and
in response to receiving the data connection page, reestablishing the data connection with the wireless network.

8. A mobile wireless device, comprising:
an application processor coupled to a wireless transceiver;
a storage device coupled to the application processor, the storage device comprising computer-executable instructions that, when executed by the application processor, cause the mobile wireless device to:
receive a voice connection request;
initiate a first voice connection with a remote device in response to receiving the voice connection request;
detect a failure of the first voice connection;
establish a data connection with a wireless network;
receive a voice connection redial request, wherein the voice connection redial request is received after detecting the failure of the first voice connection;
close the data connection with the wireless network;
tune the wireless transceiver to a voice connection channel radio frequency that is different from a data connection channel radio frequency associated with the data connection; and
initiate a second voice connection, associated with the voice connection redial request, with the remote device, wherein the second voice connection uses the voice connection channel radio frequency.

9. The mobile wireless device as recited in claim 8, wherein the execution of the computer-executable instructions by the application processor, further causes the mobile wireless device to:
before initiating the first voice connection with the remote device:
establish an initial data connection with the wireless network;
close the initial data connection in response to receiving the voice connection request; and tune the wireless transceiver to the voice connection channel radio frequency in preparation for initiating the first voice connection with the remote device.

10. The mobile wireless device as recited in claim 8, wherein the execution of the computer-executable instructions by the application processor, further causes the mobile wireless device to:
receive a data connection page from the wireless network; and
establish the data connection with the wireless network in response to receiving the data connection page.

11. The mobile wireless device as recited in claim 8, wherein the execution of the computer-executable instructions by the application processor, further causes the mobile wireless device to:
receive a data connection origination request; and
establish the data connection with the wireless network in response to receiving the data connection origination request.

12. The mobile wireless device as recited in claim 8, wherein the application processor is configured to repeatedly generate voice connection redial requests, after a voice connection failure, up to a pre-determined maximum number of redial retries.

13. The mobile wireless device as recited in claim 8, wherein the wireless network is compliant with a code division multiple access (CDMA) communication protocol.

14. The mobile wireless device as recited in claim 8, wherein the execution of the computer-executable instructions by the application processor, further causes the mobile wireless device to:
detect a termination of the second voice connection with the remote device;
tune the wireless transceiver to the data connection channel radio frequency associated with the data connection; and
reestablish the data connection with the wireless network using the data connection channel radio frequency.

15. The mobile wireless device as recited in claim 14, wherein the execution of the computer-executable instructions by the application processor, further causes the mobile wireless device to:
receive a data connection page from the wireless network; and
reestablish the data connection with the wireless network in response to receiving the data connection page.

16. A non-transitory computer-readable medium comprising computer-executable instructions that, when executed by one or more processors, cause a mobile wireless device to:
receive a voice connection request;
initiate a first voice connection with a remote device in response to receiving the voice connection request;
detect a failure of the first voice connection;
establish a data connection with a wireless network;
receive a voice connection redial request, wherein the voice connection redial request is received after detecting the failure of the first voice connection;
close the data connection with the wireless network;
tune a transceiver of the mobile wireless device to a voice connection channel radio frequency that is different from a data connection channel radio frequency associated with the data connection; and
initiate a second voice connection, associated with the voice connection redial request, with the remote device, wherein the second voice connection uses the voice connection channel radio frequency.

17. The non-transitory computer-readable medium as recited in claim 16, wherein the execution of the computer-executable instructions by the one or more processors further causes the mobile wireless device to:
before initiating the first voice connection with the remote device:
establish an initial data connection with the wireless network;
close the initial data connection with the wireless network in response to receiving the voice connection request; and
tune the transceiver of the mobile wireless device to the voice connection channel radio frequency in preparation for initiating the first voice connection with the remote device.

18. The non-transitory computer-readable medium as recited in claim 17, wherein the execution of the computer-executable instructions by the one or more processors further causes the mobile wireless device to:
receive a data connection page from the wireless network; and
establish the data connection with the wireless network in response to receiving the data connection page.

19. The non-transitory computer-readable medium as recited in claim 17, wherein the execution of the computer-executable instructions by the one or more processors further cause the mobile wireless device to:
receive a data connection origination request from within the mobile wireless device; and
establish the data connection with the wireless network in response to receiving the data connection origination request.

20. The non-transitory computer-readable medium as recited in claim 16, wherein the execution of the computer-executable instructions by the one or more processors further causes the mobile wireless device to:
detect a termination of the second voice connection with the remote device;
tune the transceiver of the mobile wireless device to the data connection channel radio frequency associated with the data connection; and
reestablish the data connection with the wireless network using the data connection channel radio frequency.

* * * * *